United States Patent [19]

Muto et al.

[11] Patent Number: 5,324,558
[45] Date of Patent: Jun. 28, 1994

[54] LAMINATED TUBE

[75] Inventors: Akira Muto; Hajime Horiuchi, both of Kurashiki, Japan

[73] Assignee: Kuraray Co., Ltd., Kurashiki, Japan

[21] Appl. No.: 870,319

[22] Filed: Apr. 17, 1992

[30] Foreign Application Priority Data

Apr. 18, 1991 [JP] Japan ................... 3-115523

[51] Int. Cl.$^5$ .............................................. B32B 5/08
[52] U.S. Cl. .................. 428/36.91; 428/36.9; 428/36.4; 428/36.1; 428/34.7; 428/34.5; 138/129; 138/132; 138/174; 138/144; 30/245
[58] Field of Search ............... 428/35.7, 36.1, 36.3, 428/36.91, 34.5, 34.7; 138/174, 153, 144, 172, 129, 132; 30/245

[56] References Cited

U.S. PATENT DOCUMENTS

| | | | |
|---|---|---|---|
| 2,262,645 | 11/1941 | Newman | 30/181 |
| 2,744,321 | 5/1956 | Keiser, Jr. | 30/237 |
| 3,490,983 | 1/1970 | Lee | 428/113 |
| 4,122,601 | 10/1978 | Katsuya | 30/298.4 |
| 4,287,495 | 9/1981 | Lund, Jr. et al. | 333/239 |
| 4,351,364 | 9/1982 | Cocks | |
| 4,657,795 | 4/1987 | Foret | 428/36.1 |
| 4,840,826 | 6/1989 | Shirasaki et al. | |

FOREIGN PATENT DOCUMENTS

| | | |
|---|---|---|
| WO84/02306 | 6/1984 | European Pat. Off. |
| 2546817 | 12/1984 | France |
| 2116476A | 9/1983 | United Kingdom |

*Primary Examiner*—Ellis P. Robinson
*Assistant Examiner*—Michael A. Williamson
*Attorney, Agent, or Firm*—Oblon, Spivak, McClelland, Maier & Neustadt

[57] ABSTRACT

Provided is a laminated tube having a logarithmic decrement of at least 0.08 and a flexural modulus of at least 1,000 kg/mm$^2$ and comprising at least 2 layers which comprise a composite material comprising a reinforcing fiber and a matrix resin. The reinforcing fibers used include an organic fiber, e.g. wholly aromatic polyester fibers and polyvinyl alcohol fiber, for at least 1 layer of the composite material layer and an inorganic fiber, e.g. carbon fiber and glass fiber, for at least 1 layer of the composite material layer.

4 Claims, 4 Drawing Sheets

LAMINATED TUBE

BACKGROUND OF THE INVENTION

1. Field of the Invention

The present invention relates to a laminated tube having a high logarithmic decrement of mechanical damping and flexural modulus and comprising layers, in a specified combination, of a composite material comprising a reinforcing fiber and a matrix resin.

The laminated tube of the present invention is light and excellent in vibration damping properties, mechanical strength and rigidity and is hence useful as tubing for portable apparatuses having power source, such as bush cutter, small vehicles such as bicycle and wheelchair, and the like.

2. Description of the Prior Art

Pipes of aluminum, which is relatively light among metals, are generally used as piping or tubing for articles requiring light weight and high mechanical strength and rigidity, e.g. portable apparatuses having power source, such as bush cutter, and small vehicles such as bicycle and wheelchair. For these items, however, there has been desired a lighter weight and reduction of vibrations transmitted from the power source or improvement of riding comfortableness. For example Japanese Patent Application Laid-open No. 170309/1986 proposes, for the tubing to be used for bush cutters, that comprising a composite material comprising a carbon fiber or glass fiber for reinforcement and a matrix resin.

It is true that the tubing comprising the above-proposed composite material is superior to aluminum tubing because of lighter weight and better vibration damping properties. There is, in some end-uses, however desired a pipe of still lighter weight and better vibration damping properties, and also for bush cutters lighter tube with still better vibration damping properties is desired for the purpose alleviating the burden that the operator should suffer.

For bush cutters, which often contact any surrounding object or the blade of which tends to be dragged into surrounding trees or the like during operation, the use of a tube having higher rigidity and impact resistance is also desired for improving the safety.

Accordingly, an object of the present invention is to provide a tube that has not only high mechanical strength and rigidity, but also markedly excellent vibration damping properties.

SUMMARY OF THE INVENTION

According to the present invention, the above object can be achieved by providing a laminated tube having a logarithmic decrement of at least 0.08 and a flexural modulus of at least 1,000 kg/mm$^2$ and comprising at least one layer (A) which comprises a composite material comprising an organic fiber and a resin and, integrally laminated therewith, at least one layer (B) which comprises another composite material comprising an inorganic fiber and a resin.

BRIEF DESCRIPTION OF THE DRAWINGS

Other features of the invention will become apparent in the course of the following exemplary descriptions when considered in connection with the accompanying drawings, wherein.

DETAILED DESCRIPTION OF PREFERRED EMBODIMENTS

Any organic fiber can be used for the laminated tube of the present invention and its examples are wholly aromatic polyester fibers, polyvinyl alcohol fiber and wholly aromatic polyamide fibers. Among these organic fibers, in view of provision of high vibration damping characteristics and impact resistance for the obtained tube, wholly aromatic polyester fibers and polyvinyl alcohol fiber are preferred, of which the former is more preferred.

The wholly aromatic polyester constituting the wholly aromatic polyester fibers is a polyester derived principally from a divalent aromatic compound monomer such as aromatic hydroxy acids, aromatic dicarboxylic acids and aromatic diols, and its examples are liquid crystal wholly aromatic polyesters such as wholly aromatic copolyester from principal monomer components of p-hydroxybenzoic acid and 6-hydroxy-2-naphthoic acid and showing an anisotropy in the melt phase. Vectran ® made by Kuraray Co. is known as a representative example of such wholly aromatic copolyester fiber.

The polyvinyl alcohol fiber usable in the present invention preferably comprises a polyvinyl alcohol having an average degree of polymerization of at least 1,500.

The wholly aromatic polyamide constituting the wholly aromatic polyamide fiber usable in the present invention includes those derived principally from monomers of an aromatic diamine and an aromatic dicarboxylic acid, an example of which is poly(p-phenyleneterephthalamide). Kevlar ® made by Du Pont Co. is known as a representative example of the fibers comprising such wholly aromatic polyamides.

The inorganic fiber used in the invention may be of any type, without limitation, and for example carbon fiber and glass fiber are used. In view of provision of the laminated tube of the present invention with high mechanical strength and rigidity, it is desirable to use an inorganic fiber of carbon fiber and/or glass fiber. Carbon fiber can give the resulting tube a high rigidity, while glass fiber can give it appropriate impact strength and rigidity and excellent insulation property.

The organic fiber or inorganic fiber for reinforcement purpose may be of various forms. Representative examples of the forms are roving and woven fabrics formed of continuous multifilament yarn. These reinforcing fibers are incorporated in the resulting tube while being wrapped at a properly selected angle with the tube axis.

Examples of the matrix resin used in the present invention are thermosetting resins such as epoxy, unsaturated polyester and thermosetting acrylic resins.

Figure 1A:
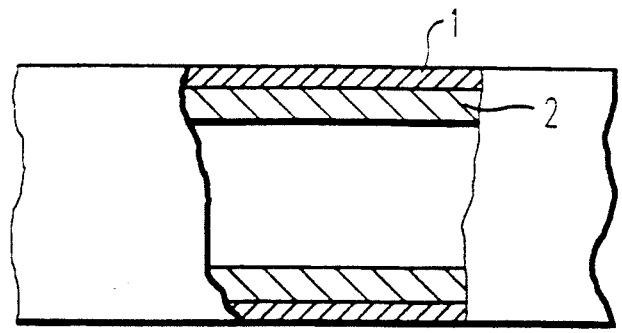
FIGS. 1-(a) and 1-(b) are partially sectional side views each showing an example of the 2-layer structure of a laminated tube according to the present invention.
Figure 1B:
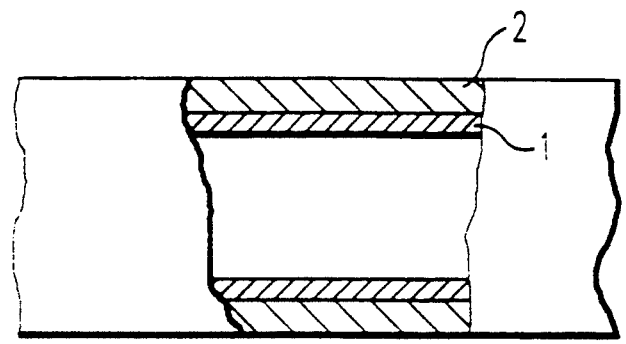
Figure 2A:
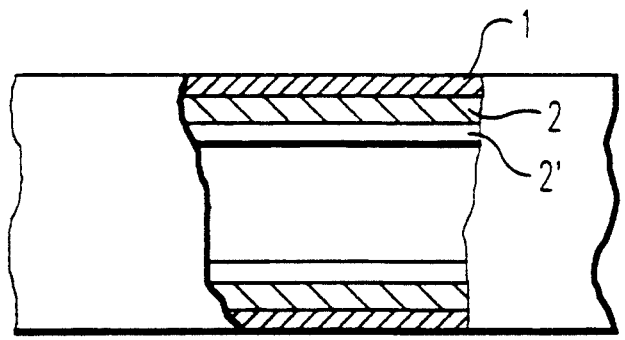
FIGS. 2-(a) and 2-(b) are partially sectional side views each showing an example of the 3-layer structure of a laminated tube according to the present invention.
Figure 2B:
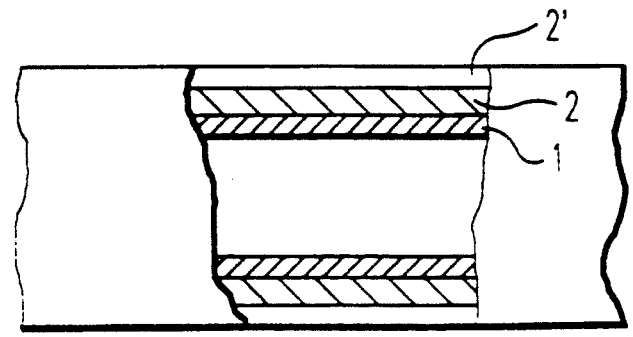
Figure 3A:
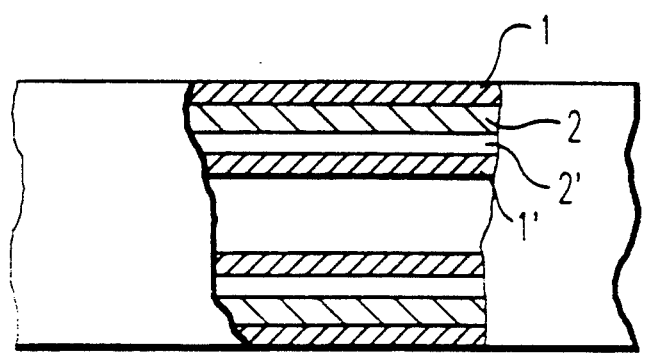
FIGS. 3-(a) and 3-(b) are partially sectional side views each showing an example of the 4-layer structure of a laminated tube according to the present invention.
Figure 3B:
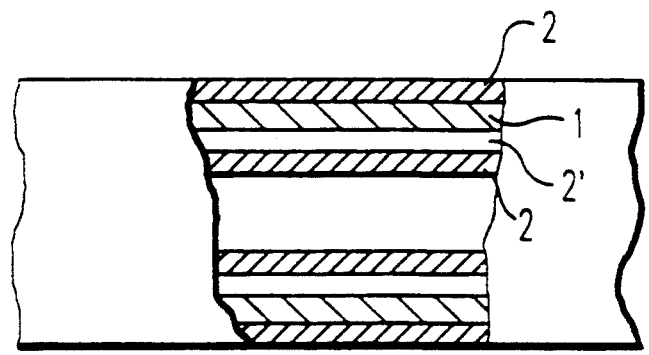

The present invention is now described by reference to the drawings which are by no means limitative of the invention. FIGS. 1-(a) and 1-(b), FIGS. 2-(a) and 2-(b) and FIGS. 3-(a) and 3-(b) are all partially sectional side views showing examples of the tube of the present invention. FIGS. 1-(a) and 1-(b) each shows an example of a tube having a 2-layer structure of layer-1 (A)/layer-2 (B), FIGS. 2-(a) and 2-(b) that of a tube having a 3-layer structure of layer-1 (A)/layer-2 (B)/layer-2' (B) and FIGS. 3-(a) and 3-(b) that of a tube having a 4-layer structure of layer-1 (A)/layer-2 (B)/layer-2' (B)/layer-1' (A) or layer-2 (B)/layer-1 (A)/layer-2' (B) /layer- 2 (B).

In the laminated tube of the present invention, the layer (A) chiefly contributes to improvement of vibration damping properties and impact resistance, while the layer (B) to improvement of rigidity and mechanical strength. As described above, with the inorganic fiber contained in the layer (B) being carbon fiber, the rigidity of the resulting tube effectively improves, while its impact strength and rigidity improves to an appropriate level with glass fiber. It is therefore preferred where both high rigidity and impact strength are required, to provide layers (B) of both one comprising a resin and carbon fiber and one comprising a resin and glass fiber. It is preferred, for the purpose of sufficiently producing the effect of improving vibration damping properties originating from the layer (A) and that of improving mechanical strength and rigidity originating from the layer (B), that the thickness of each of the layers (A) and (B) be at least 0.1 mm. It is also preferred, in view of satisfaction in all of the vibration damping properties, mechanical strength and rigidity of the resulting tube, the total volume of the reinforcing fiber used, i.e. organic fiber and inorganic fiber used, be 20 to 70% by volume based on the volume of the tube, more preferably 40 to 60% by volume on the same basis. In view of the same, the total volume of the organic fiber is preferably 3 to 40% by volume, preferably 7 to 25% by volume, based on the total volume of the reinforcing fiber used.

It is necessary that the laminated tube of the present invention have a logarithmic decrement, which represents the level of vibration damping properties, of at least 0.08 and preferably at least 0.09, more preferably at least 0.10. With a logarithmic decrement of less than 0.08, the tube is of insufficient vibration damping properties. The logarithmic decrement herein is determined according to the following method.

Figure 4:
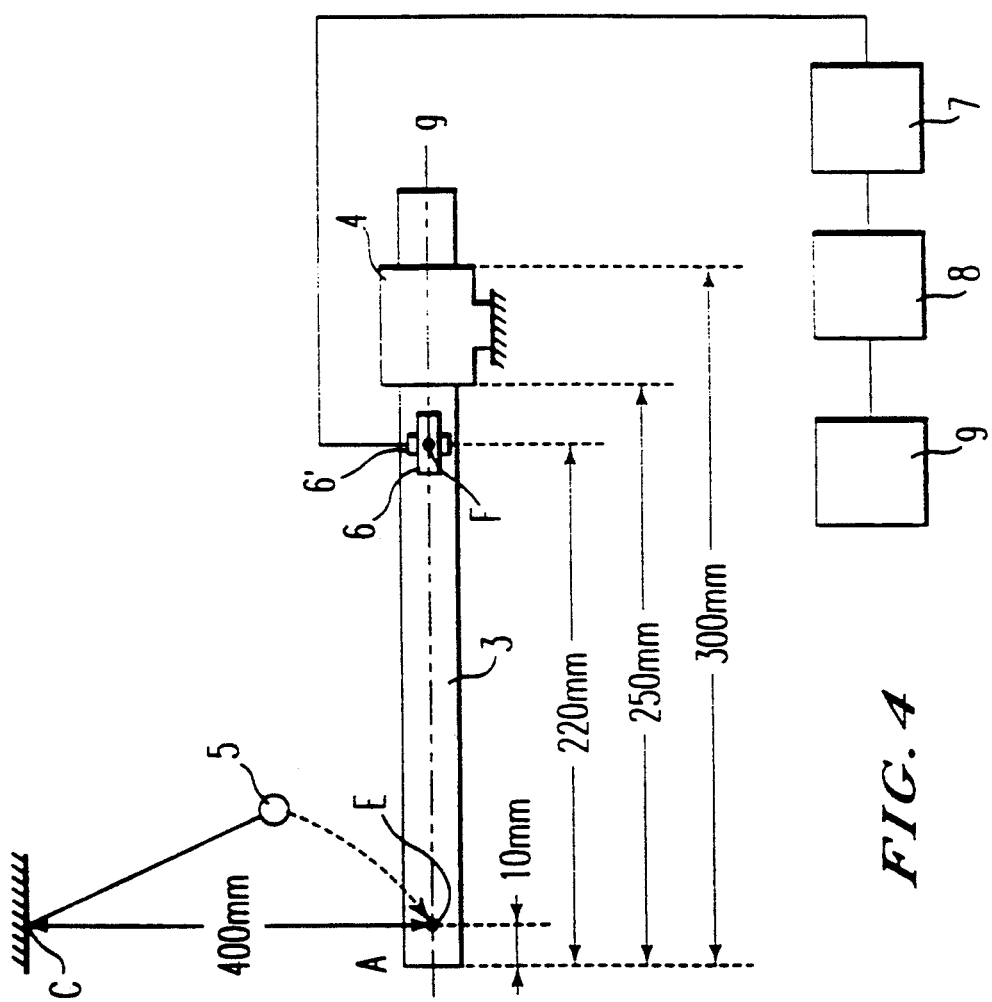
FIG. 4 is a diagram showing the test method for logarithmic decrement, which is used for specifying the laminated tube of the present invention.

FIG. 4 is a diagram showing how the test for logarithmic decrement which specifies the laminated tube of the present invention is conducted. A test piece tube 3 is horizontally maintained by cramping, with a vice 4 from both sides, a length of 50 mm, from 250 mm from one end (herein-after referred to as "end-A") to 300 mm from end-A while applying a torque of 70 kg·cm to the vice. Let a point on the longitudinal axis of the tube 3 and at a distance 10 mm from the end-A be named point-B (not shown). At a point (hereinafter referred to as "point-C") 400 mm vertically above the point-B is fixed one end of a thin string (a twisted yarn of 3 plies of No. 10 count cotton yarn) having a length of 390 mm and the other end of which is connected to a steel ball 5 having a diameter of 20 mm and a weight of 32.8 g. The steel ball 5 is held, while the string is kept tense, with its center being at a point lying in a vertical plane and having a height based on a horizontal plane passing the longitudinal axis of the tube 3 of 200 ram, and then released to fall down freely. The steel ball 5 falls while drawing an arc about a center of point-C and having a radius of 400 mm to collide the side of the tube 3. The exact place of the collision on the side of the tube 3 is around nearer one of the two points where the circumference of the tube 3 on a plane perpendicular to the tube axis and passing the point-B and a horizontal line passing the point-B crosses (hereinafter this point of collision is referred to as "point-E"). The wave pattern of the strain in the direction of the tube axis, i.e. expansion and contraction vibration, is detected at a point (hereinafter referred to as "point-F") on a generating line g of the point-E on the peripheral surface of the tube 3 and at a distance of 220 mm from the end-A. The measurement of the expansion and contraction vibration in the direction of the longitudinal axis of the tube 3 is for example conducted by patching two strain gauges 6 and 6', one in the axial position and the other in the circumferential position such that they cross each other at the point F, transmitting the signals from the strain gauges 6 and 6' to an apparatus 8 for measuring dynamic strain via a bridge box 7, and recording displacements of the strain in the direction of tube axis, i.e. expansion and contraction vibration, detected with the measuring apparatus 8 as a wave pattern on a recorder 9.

Figure 5:
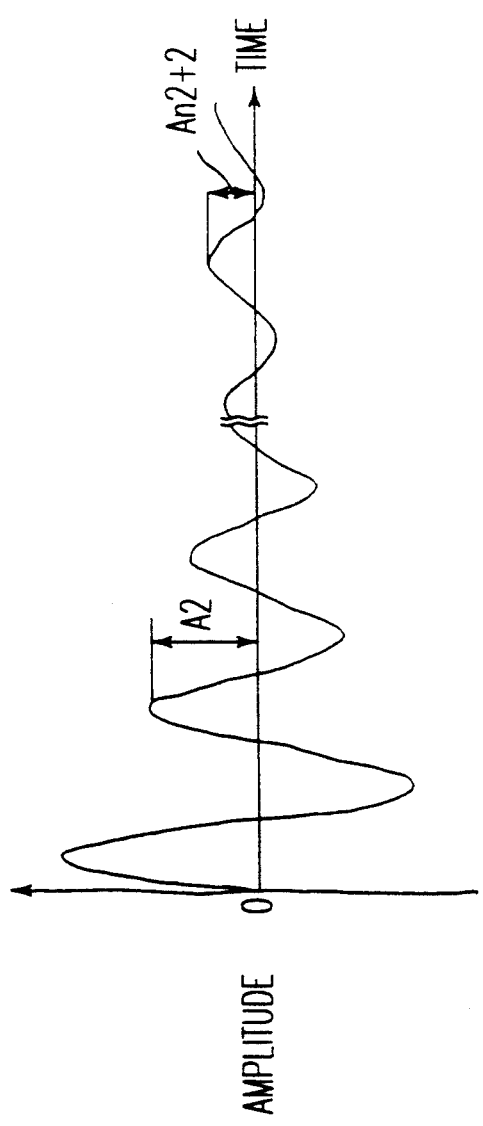
FIG. 5 is a graph showing an example of the wave pattern of expansion and contraction vibration in the longitudinal direction of a tube.

FIG. 5 is a graph showing an example of the wave pattern recorded according to the above method of the expansion and contraction vibration in the longitudinal direction of the tube. The logarithmic decrement specifying the laminated tube of the present invention is determined based on the obtained wave pattern by a known method [e.g. Nobushi Yamada: "Shindo Kogaku Nyumon" (Power Company, Tokyo, 1990) p. 30–31] which is employed for experimentally obtaining a logarithmic decrement from the wave pattern of damped vibration. That is, where the second amplitude is represented by $A_2$ and the $(n+2)$-th (n is an integer of 1 or more) amplitude by $A_{(n+2)}$, the logarithmic decrement, $\delta$, is obtained as:

$$\delta = (1/n)\ln[A_2/A_{(n+2)}]$$

It is desirable in view of high accuracy and other factors to employ an n of at least 5 for obtaining the logarithmic decrement specifying the laminated tube of the present invention.

It is necessary that the laminated tube of the present invention have a flexural modulus of at least 1,000 kg/mm² and preferably at least 1,200 kg/mm². For use in bush cutters for forestry work, the laminated tube of the present invention preferably has a flexural modulus of at least 1,600 kg/mm². If the flexural modulus is less than 1,000 kg/mm², the tube will be of insufficient rigidity and become readily bent. The flexural modulus in the present invention is the value obtained by conducting a bending test according to JIS K6911 "BENDING TEST OF MOLDED ARTICLES (three-point bending test method) on a specimen of the tube itself with a support span of 200 mm and calculating by $$E_b = 4\,(L^3)\,(F/\Delta 1)/[3\pi(D_1^4 - D_2^4)]$$

wherein $E_b$, $D_1$, and $D_2$ represent the flexural modulus (kg/mm$^2$), outside diameter (mm) and inside diameter (mm) of the tube, respectively and $F/\Delta 1$, L and $\pi$ represent the gradient (kg/mm) of the initial linear part of the stress-strain curve, the support span (200 mm) in the test and the circular constant (3.14), respectively.

For the laminated tube of the present invention, appropriate selection of the positioning and thickness of the layer (A), the material, shape and amount of the organic fiber used, the type and amount of the matrix resin and like factors can maintain its logarithmic decrement at at least 0.08. The positioning of the layer (A) in a laminated structure is particularly important for the purpose of effectively improving the logarithmic decrement while maintaining the mechanical strength and rigidity at high level.

In the laminated tube of the present invention, at least one layer (A) is preferably positioned near the inner surface and/or near the outer surface, for the purpose of providing both excellent vibration damping properties and high mechanical strength and rigidity. In other words, where the inside diameter and outside diameter of a laminated tube are represented by Di (mm) and Do (mm), respectively, it is desirable that at least one layer (A) have an outside diameter do (mm) satisfying $$do < (3Di + Do)/4$$

or have an inside diameter di (mm) satisfying $$di > (Di + 3Do)/4,$$

or be so positioned as to satisfy both of the above conditions. Positioning at least one layer (A) as the innermost or outermost layer of a laminated tube will make particularly large contribution to improvement of its logarithmic decrement. In this case, if it is necessary to subject the exposed surface of the layer (A) to post processing such as cutting or grinding, the exposed layer (A) preferably comprises a composite material comprising polyvinyl alcohol fiber and a matrix resin and having good processability.

With respect to the winding angle of the constituting layers, it is desirable to position, from inside, all of 90°-winding layers, all of 0°-winding layers and all of "angled" winding layers, in volume ratios of 20 to 50%, 25 to 60% and 10 to 35%, respectively. The term "angle" herein means the angle formed by the reinforcing fiber with the longitudinal axis of the laminated tube. The term "angled winding layer" herein means a layer wound at an angle between 0° to 90°. The angle of the angled winding layers is preferably in a range of 15° to 75°. The above tube construction realizes well-balanced characteristics of flexural modulus, tube rigidity, impact resistance and other properties.

For use in bush cutters, employment of the above preferred conditions can provide the laminated tube of the present invention with a tube rigidity of at least 30 kg-mm and an impact angle of at least 100°, thereby enhancing safety when shock is applied or the blade of the cutter is dragged into trees or other obstacles.

The laminated tube of the present invention can be produced by known various processes being employed for producing laminated tubes from composite materials. Available for this purpose are:

(1) a tape wrapping process which comprises using unidirectional prepreg sheet comprising a reinforcing fiber impregnated with resin or a cloth prepreg sheet comprising a woven fabric impregnated with resin, wrapping the sheet in plies around a mandrel at a specified angle, further wrapping a stretching tape around the thus wrapped sheet and curing the obtained structure by heating;

(2) a filament winding process which comprises continuously wrapping a reinforcing fiber of a roving, while impregnating it with a resin, in spirals around a mandrel, or continuously and herically wrapping the above unidirectional prepreg sheet or a tape obtained by cutting the above cloth prepreg sheet around a mandrel, further wrapping a stretching tape and curing the obtained structure by heating;

(3) a combination of the tape wrapping process and the filament winding process;

(4) what is known as a "pultrusion" process which comprises impregnating a fibrous reinforcing material oriented unidirectionally and/or a reinforcing woven fabric with a resin, placing the obtained matter in a die to harden therein and pulling out the hardened product; and other processes.

The laminated tube thus obtained may as required be subjected to post-processing such as cutting, grinding or painting, of its surface.

Other features of the invention will become apparent in the course of the following descriptions of exemplary embodiments which are given for illustration of the invention and are not intended to be limiting thereof. In the Examples and Comparative Examples that follow, the performances of the obtained tubes were tested according to the following methods.

(a) Logarithmic Decrement

The method described above is applied. A test piece cut from the specimen tube and having a prescribed length is tested with an n of 6.

(b) Flexural Modulus

"BENDING TEST OF MOLDED ARTICLES" (three-point bending test method) as specified in JIS K6911 is applied on a test piece of the tube itself with a support span of 200 mm. The flexural modulus, $E_b$, of the tube is calculated by $$E_b = 4\,(L^3)\,(F/\Delta 1)\,/[3\pi(D_1^4 - D_2^4)]$$

wherein $E_b$, $D_1$, and $D_2$ represent the flexural modulus (kg/mm$^2$), outside diameter (mm) and inside diameter (mm) of the tube, respectively and $F/\Delta 1$, L and $\pi$ represent the gradient (kg/mm) of the initial linear part of the stress-strain curve, the support span (200 mm) in the test and the circular constant (3.14), respectively.

(c) Tube Rigidity

A 10-mm long test piece cut from a specimen is pressed between press boards and the relationship between the load (F) and the deflection ($\Delta l$) is obtained, from which:

$$Ec = F/\Delta l$$

wherein Ec is the tube rigidity (kg/mm) and $F/\Delta l$ is the gradient of the initial linear part of the stress-strain curve.

(d) Impact Resistance

Figure 6:
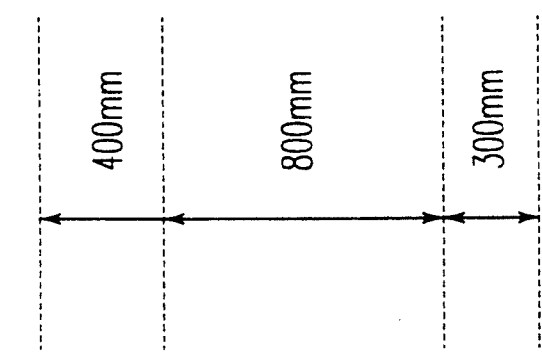
FIG. 6 shows how the impact resistance of a tube is measured.
Figure 6:
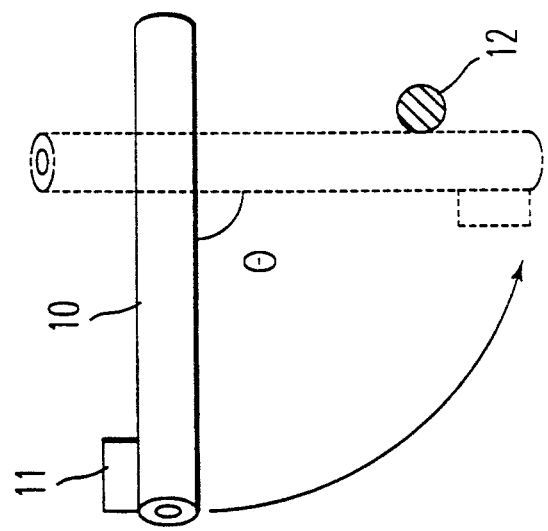

A method illustrated in FIG. 6 is applied. A point 1100 mm distant from its end of a specimen tube 10 is pivotally fixed. A 16 mm-φ steel bar is placed under the fixed point horizontally and in a direction perpendicular to the plane containing the specimen and at such a height that it will contact a point on the specimen and distant from the free end when the specimen pivots down to the vertical position. A load 11 of 1 kg is attached to the free end and the end is lifted up to a prescribed angle. The end is released so that it will fall down drawing an arc about the fixed point and collide the steel bar. The falling test is repeated with increasing falling angles and with a renewed specimen, and each time the tube is visually inspected for deformation. The angle ($\theta$) at which a specimen shows any irregular appearance for the first time is reported as "impact angle".

EXAMPLES

EXAMPLE 1

A 3-layer laminated tube was produced by tape wrapping process from a unidirectional prepreg comprising a carbon fiber and epoxy resin (hereinafter referred to as "CF-UDPP"), a unidirectional prepreg comprising a glass fiber and epoxy resin (hereinafter referred to as "GF-UDPP") and a unidirectional prepreg comprising a wholly aromatic polyester fiber and epoxy resin (hereinafter referred to as "AF-UDPP"). The CF-UDPP used was "TORAYCA 3053" (made by Toray Co.; fiber weight: 125 g/m$^2$; resin content: 30% by weight), the GF-UDPP was "GE17500-51 933N" (made by Nippon Steel Chemical Co.; fiber weight: 175 g/m$^2$; resin content: 36% by :weight) and the AF-UDPP was "V10000-51940N" (made by Nippon Steel Chemical Co.; wholly aromatic polyester fiber: "Vectran ®" made by Kuraray Co.; fiber weight: 100 g/m$^2$; resin content: 40% by weight). These prepregs were successively wrapped around a mandrel having an outside diameter of 21 mm with a rolling table in 4 plies, 7 plies and single ply, respectively, and at angles as shown below.

|         | Type of prepreg | Angle (°) | No. of plies |
|---------|-----------------|-----------|--------------|
| Inside  | CF-UDPP         | 45        | 4            |
| ↓       | GF-UDPP         | 0         | 2            |
| ↓       | GF-UDPP         | 90        | 3            |
| ↓       | GF-UDPP         | 45        | 2            |
| Outside | AF-UDPP         | 0         | 1            |

A stretching tape was further wrapped around the thus prepared laminate with a tape wrapping machine, and the entire structure was cured by heating in a heating oven at 90° C. for 30 minutes and then at 130° C. for 90 minutes. After the curing the mandrel was pulled out and the stretching tape was removed, to obtain a 3-layer laminated tube having an inside diameter, wall thickness, length and weight of 21 mm, 1.58 mm, 1,500 mm and 296 g, respectively. The thicknesses of the carbon fiber-containing layer, the glass fiber-containing layer and the wholly aromatic fiber-containing layer of the thus obtained laminated tube were 0.44 mm, 1.02 mm and 0.12 mm, respectively. The volume occupied by the reinforcing fibers in the laminated tube was 51%, and the ratio of the wholly aromatic polyester fiber to the total fibers was 9% by volume. The laminated tube had a logarithmic decrement of 0.11 and a flexural modulus, tube rigidity and impact angle of 1,498 kg/mm$^2$, 25 kg-mm and 130°, respectively.

EXAMPLE 2

Example 1 was repeated except for changing the wrapping plies and angles of the prepregs as shown below, to obtain a 3-layer laminated tube having an inside diameter, wall thickness, length and weight of 21 mm, 1.57 mm, 1,500 mm and 293 g, respectively. The thicknesses of the wholly aromatic fiber-containing layer, the carbon fiber-containing layer and the glass fiber-containing layer of the thus obtained laminated tube were 0.12 mm, 0.44 mm and 1.01 mm, respectively. The volume occupied by the reinforcing fibers in the laminated tube was 51%, and the ratio of the wholly aromatic polyester fiber to the total fibers was 8% by volume. The laminated tube had a logarithmic decrement of 0.10 and a flexural modulus, tube rigidity and impact angle of 1,339 kg/mm$^2$, 20 kg-mm and 120°, respectively.

|         | Type of prepreg | Angle (°) | No. of plies |
|---------|-----------------|-----------|--------------|
| Inside  | AF-UDPP         | 0         | 1            |
| ↓       | CF-UDPP         | 45        | 4            |
| ↓       | GF-UDPP         | 0         | 2            |
| ↓       | GF-UDPP         | 90        | 3            |
| Outside | GF-UDPP         | 45        | 2            |

EXAMPLE 3

Example 1 was repeated except for using, instead of AF-UDPP, a unidirectional prepreg comprising a polyvinyl alcohol fiber and epoxy resin (hereinafter referred to as "VF-UDPP"), to obtain a 3-layer laminated tube having an inside diameter, wall thickness, length and weight of 21 mm, 1.58 mm, 1,500 mm and 294 g, respectively. The VF-UDPP used was a prepreg containing 100 g/m$^2$ of a polyvinyl alcohol fiber (Vinylon-T-7901-2, 1,800d/1,000f, average degree of polymerization of the polyvinyl alcohol: 4,000, made by Kuraray Co.) and 37% by weight of the resin, and wrapped in a single ply. The thicknesses of the carbon fiber-containing layer, the glass fiber-containing layer and the polyvinyl alcohol fiber-containing layer of the thus obtained laminated tube were 0.44 mm, 1.02 mm and 0.12 respectively. The volume occupied by the reinforcing fibers in the laminated tube was 51%, and the ratio of the polyvinyl alcohol fiber to the total fibers was 10% by volume. The laminated tube had a logarithmic decrement of 0.12 and a flexural modulus, tube rigidity and impact angle of 1,303 kg/mm$^2$, 25 kg-mm and 125°, respectively.

|         | Type of prepreg | Angle (°) | No. of plies |
|---------|-----------------|-----------|--------------|
| Inside  | CF-UDPP         | 45        | 4            |
| ↓       | GF-UDPP         | 0         | 2            |
| ↓       | GF-UDPP         | 90        | 3            |
| ↓       | GF-UDPP         | 45        | 2            |
| Outside | VF-UDPP         | 0         | 1            |

EXAMPLE 4

The same AF-UDPP, CF-UDPP and GF-UDPP as used in Example 1 and the same VF-UDPP as used in Example 3 were successively wrapped around a mandrel having an outside diameter of 21 mm, in single ply, 4 plies, 7 plies and single ply, respectively at winding angles as shown below. A stretching tape was further wrapped around the thus prepared laminate and entire structure was cured by heating in a heating oven at 90°

C. for 30 minutes and then at 130° C. for 90 minutes, to obtain a 4-layer laminated tube having an inside diameter, wall thickness, length and weight of 21 mm, 1.69 mm, 1,500 mm and 312 g, respectively. The thicknesses of the wholly aromatic fiber-containing layer, the carbon fiber-containing layer, the glass fiber-containing layer and the polyvinyl alcohol fiber-containing layer of the thus obtained laminated tube were 0.12 mm, 0.44 mm, 1.01 mm and 0.12 mm, respectively. The volume occupied by the reinforcing fibers in the laminated tube was 52%, and the ratio of the sum of the wholly aromatic polyester fiber and the polyvinyl alcohol fiber to the total fibers was 16% by volume. The laminated tube had a logarithmic decrement of 0.17 and a flexural modulus, tube rigidity and impact angle of 1,391 kg/mm$^2$, 24 kg-mm and 130°, respectively.

|  | Type of prepreg | Angle (°) | No. of plies |
|---|---|---|---|
| Inside | AF-UDPP | 0 | 1 |
| ↓ | CF-UDPP | 45 | 4 |
| ↓ | GF-UDPP | 0 | 2 |
| ↓ | GF-UDPP | 90 | 3 |
| ↓ | GF-UDPP | 45 | 2 |
| Outside | VF-UDPP | 0 | 1 |

EXAMPLE 5

The same procedure as in Example 1 was followed except that the CF-UDPP and AF-UDPP, i.e. without GF-UDPP, were successively wrapped around a mandrel having an outside diameter of 21 mm, in 12 plies and 2 plies, respectively at winding angles as shown below, to obtain a 2-layer laminated tube having an inside diameter, wall thickness, length and weight of 21 mm, 1.56 mm, 1,500 mm and 260 g, respectively. The thicknesses of the carbon fiber-containing layer and the wholly aromatic fiber-containing layer of the thus obtained laminated tube were 1.32 mm and 0.24 mm, respectively. The volume occupied by the reinforcing fibers in the laminated tube was 61%, and the ratio of the wholly aromatic polyester fiber to the total fibers was 15% by volume. The laminated tube had a logarithmic decrement of 0.13 and a flexural modulus, tube rigidity and impact angle of 1,856 kg/mm$^2$, 32 kg-mm and 95°, respectively.

|  | Type of prepreg | Angle (°) | No. of plies |
|---|---|---|---|
| Inside | CF-UDPP | 45 | 4 |
| ↓ | CF-UDPP | 0 | 4 |
| ↓ | CF-UDPP | 90 | 4 |
| Outside | AF-UDPP | 0 | 2 |

EXAMPLE 6

A CF-UDPP of TORAYCA 3051 (made by Toray Co.;. fiber weight: 175 g/m$^2$, resin content: 36% by weight) and a GF-UDPP of GE13500-51933N (made by Nippon Steel Chemical Co.; fiber weight: 135 g/m$^2$, resin content: 33% by weight) were used, together with the same AF-UDPP as used in Example 1. These unidirectional prepregs were wrapped around a mandrel having an outside diameter of 20.7 mm in the following order, angle and plies.

|  | Type of prepreg | Angle (°) | No. of plies |
|---|---|---|---|
| Inside | CF-UDPP | 90 | 2 |
| ↓ | GF-UDPP | 90 | 3 |
| ↓ | CF-UDPP | 0 | 3 |
| ↓ | AF-UDPP | 0 | 1 |
| Outside | CF-UDPP | 45 | 2 |

Wrapping of a stretching tape around the obtained structure and curing by heating were conducted in the same manner as in Example 1, to obtain a 3-kind hybrid tube having an inside diameter, wall thickness, length and weight of 20.7 mm, 1.71 mm, 1,500 mm and 280 g, respectively. The thicknesses of the carbon fiber-containing layer, the glass fiber-containing layer and the wholly aromatic fiber-containing layer of the thus obtained laminated tube were 1.26 mm, 0.33 mm and 0.12 mm, respectively. The volume occupied by the reinforcing fibers in the laminated tube was 54%, and the ratio of the wholly aromatic polyester fiber to the total fibers was 8% by volume. The ratios of 90°-winding layer, 0°-winding layer and 45°-winding layer to the total were 38% by volume, 40% by volume and 22% by volume, respectively. The laminated tube had a logarithmic decrement of 0.11 and a flexural modulus, tube rigidity and impact angle of 2,019 kg/mm$^2$, 56 kg-mm and 120°, respectively. The tube thus had well-balanced properties of logarithmic decrement, flexural modulus, tube rigidity and impact resistance.

EXAMPLE 7

Example 1 was repeated except that the same CF-UDPP, GF-UDPP and AF-UDPP as used in Example 6 were used and that these prepregs were wrapped in the following manner, to obtain a 3-kind hybrid tube having an inside diameter, wall thickness, 1 length and weight of 20.7 mm, 1.71 mm, 1,500 mm and 284 g, respectively.

|  | Type of prepreg | Angle (°) | No. of plies |
|---|---|---|---|
| Inside | AF-UDPP | 90 | 1 |
| ↓ | CF-UDPP | 90 | 2 |
| ↓ | GF-UDPP | 90 | 3 |
| ↓ | CF-UDPP | 0 | 3 |
| Outside | CF-UDPP | 45 | 2 |

The thicknesses of the carbon fiber-containing layer, the glass fiber-containing layer and the wholly aromatic fiber-containing layer of the thus obtained laminated tube were 1.26 mm, 0.33 mm and 0.12 mm, respectively. The volume occupied by the reinforcing fibers in the laminated tube was 53%, and the ratio of the wholly aromatic polyester fiber to the total fibers was 7% by volume. The ratios of 90°-winding layer, 0°-winding layer and 45°-winding layer to the total were 46% by volume, 32% by volume and 22% by volume, respectively. The laminated tube had a logarithmic decrement of 0.09 and a flexural modulus, tube rigidity and impact angle of 2,032 kg/mm$^2$, 53 kg-mm and 110°, respectively.

EXAMPLE 8

Example 1 was repeated except for changing the wrapping construction to that shown in the following table to obtain a 3-kind hybrid tube having an inside diameter, wall thickness, length and weight of 21 mm, 1.58 mm, 1,500 mm and 296 g, respectively.

|         | Type of prepreg | Angle (°) | No. of plies |
|---------|-----------------|-----------|--------------|
| Inside  | GF-UDPP         | 90        | 4            |
| ↓       | GF-UDPP         | 0         | 3            |
| ↓       | CF-UDPP         | 0         | 2            |
| ↓       | AF-UDPP         | 0         | 1            |
| Outside | CF-UDPP         | 45        | 2            |

The thicknesses of the carbon fiber-containing layer, the glass fiber-containing layer and the wholly aromatic fiber-containing layer of the thus obtained laminated tube were 0.44 mm, 1.02 mm and 0.12 mm, respectively. The volume occupied by the reinforcing fibers in the laminated tube was 52%, and the ratio of the wholly aromatic polyester fiber to the total fibers was 10% by volume. The ratios of 90°-winding layer, 0°-winding layer and 45°-winding layer to the total were 26% by volume, 57% by volume and 17% by volume, respectively. The laminated tube had a logarithmic decrement of 0.10 and a flexural modulus, tube rigidity and impact angle of 1,608 kg/mm$^2$, 34 kg-mm and 130°, respectively. These data show that the tube has, although a little low flexural modulus, excellent logarithmic decrement and impact resistance and is of well-balanced properties.

EXAMPLE 9

Example 3 was repeated except for changing the wrapping construction to that shown in the following table to obtain a 3-kind hybrid tube having an inside diameter, wall thickness, length and weight of 21 mm, 1.58 mm, 1,500 mm and 294 g, respectively.

|         | Type of prepreg | Angle (°) | No. of plies |
|---------|-----------------|-----------|--------------|
| Inside  | GF-UDPP         | 90        | 4            |
| ↓       | GF-UDPP         | 0         | 3            |
| ↓       | CF-UDPP         | 0         | 2            |
| ↓       | VF-UDPP         | 0         | 1            |
| Outside | CF-UDPP         | 45        | 2            |

The thicknesses of the carbon fiber-containing layer, the glass fiber-containing layer and the polyvinyl alcohol fiber-containing layer of the thus obtained laminated tube were 0.44 mm, 1.02 mm and 0.12 mm, respectively. The volume occupied by the reinforcing fibers in the laminated tube was 51%, and the ratio of the polyvinyl alcohol fiber to the total fibers was 11% by volume. The ratios of 90°-winding layer, 0°-winding layer and 45°-winding layer to the total were 26% by volume, 57% by volume and 17% by volume, respectively. The laminated tube had a logarithmic decrement of 0.11 and a flexural modulus, tube rigidity and impact angle of 1,503 kg/mm$^2$, 34 kg-mm and 125°, respectively. These data show that the tube has, although a little low flexural modulus and tube rigidity, excellent logarithmic decrement and impact resistance and is of well-balanced properties.

EXAMPLE 10

Example 4 was repeated except for changing the wrapping construction to that shown in the following table and using a mandrel having an outside diameter of 20.7 mm, to obtain a 4-kind hybrid tube having an inside diameter, wall thickness, length and weight of 20.7 mm, 1.69 mm, 1,500 mm and 312 g, respectively.

|         | Type of prepreg | Angle (°) | No. of plies |
|---------|-----------------|-----------|--------------|
| Inside  | AF-UDPP         | 90        | 1            |
| ↓       | GF-UDPP         | 90        | 4            |
| ↓       | GF-UDPP         | 0         | 3            |
| ↓       | CF-UDPP         | 0         | 2            |
| ↓       | VF-UDPP         | 0         | 1            |
| Outside | CF-UDPP         | 45        | 2            |

The thicknesses of the wholly aromatic polyester fiber, the carbon fiber-containing layer, the glass fiber-containing layer and the polyvinyl alcohol fiber-containing layer of the thus obtained laminated tube were 0.12 mm, 0.44 mm, 1.01 mm and 0.12 mm, respectively. The volume occupied by the reinforcing fibers in the laminated tube was 52%, and the ratio of the sum of the wholly aromatic polyester fiber and the polyvinyl alcohol fiber to the total fibers was 16% by volume. The ratios of 90°-winding layer, 0°-winding layer and 45°-winding layer to the total were 39% by volume, 47% by volume and 14% by volume, respectively. The laminated tube had a logarithmic decrement of 0.14 and a flexural modulus, tube rigidity and impact angle of 1,476 kg/mm$^2$, 45 kg-mm and 135°, respectively. These data show that the tube has, although a little low flexural modulus, excellent logarithmic decrement, tube rigidity and impact resistance and is of well-balanced properties.

EXAMPLE 11

Example 1 was repeated except that only 2 prepregs, i.e. the same CF-UDPP and VF-UDPP as used in Example 3 were used and wrapped as shown in the following table to obtain a 2-kind hybrid tube having an inside diameter, wall thickness, length and weight of 21 mm, 1.56 mm, 1,500 mm and 260 g, respectively.

|         | Type of prepreg | Angle (°) | No. of plies |
|---------|-----------------|-----------|--------------|
| Inside  | CF-UDPP         | 90        | 6            |
| ↓       | CF-UDPP         | 0         | 4            |
| ↓       | CF-UDPP         | 45        | 2            |
| Outside | VF-UDPP         | 45        | 2            |

The thicknesses of the carbon fiber-containing layer and the polyvinyl alcohol fiber-containing layer of the thus obtained laminated tube were 1.32 mm and 0.24 mm, respectively. The volume occupied by the reinforcing fibers in the laminated tube was 62%, and the ratio of the polyvinyl alcohol fiber to the total fibers was 16% by volume. The ratios of 90°-winding layer, 0°-winding layer and 45°-winding layer to the total were 41% by volume, 28% by volume and 31% by volume, respectively. The laminated tube had a logarithmic decrement of 0.15 and a flexural modulus, tube rigidity and impact angle of 1,798 kg/mm$^2$, 63 kg-mm and 105°, respectively.

Comparative Example 1

The same CF-UDPP as used in Example 1 was wrapped around a mandrel having an outside diameter of 21 mm in 14 plies, and a stretching tape was further wrapped there-around. Thereafter the procedure of Example 1 was followed to conduct curing by heating, pulling out the mandrel and removal of the tape, to obtain a single-kind/14-ply tube having an inside diameter, wall thickness, length and weight of 21 mm, 1.54 mm, 1,500 mm and 264 g, respectively.

The thus obtained tube had a logarithmic decrement of 0.06, and a flexural modulus of 2,133 kg/mm². The tube was thus poor in vibration damping property.

Comparative Example 2

The same GF-UDPP as used in Example 1 was wrapped around a mandrel having an outside diameter of 21 mm in 11 plies, and a heat-shrinking tape was further wrapped there-around. Thereafter the procedure of Example 1 was followed to conduct curing by heating, pulling out the mandrel and removal of the tape, to obtain a single-kind/11-ply tube having an inside diameter, wall thickness, length and weight of 21 mm, 1.59 mm, 1,500 mm and 320 g, respectively.

The thus obtained tube had a logarithmic decrement of 0.07, and a flexural modulus of and 1,150 kg/mm². The tube was thus poor in vibration damping property.

Comparative Example 3

The same AF-UDPP as used in Example 1 was wrapped around a mandrel having an outside diameter of 21 mm in 13 plies, and a stretching tape was further wrapped there-around. Thereafter the procedure of Example 1 was followed to conduct curing by heating, pulling out the mandrel and removal of the tape, to obtain a single-kind/13-ply tube having an inside diameter, wall thickness, length and weight of 21 mm, 1.56 mm, 1,500 mm and 228 g, respectively.

Although the thus obtained tube had a logarithmic decrement of 0.21, it showed a flexural modulus of 692 kg/mm². The tube was thus poor in rigidity.

Comparative Example 4

Example 6 was repeated except that only the CF-UDPP and GF-UDPP were used and that these prepregs were wrapped in the following manner, to obtain a 2-kind hybrid tube having an inside diameter, wall thickness, length and weight of 20.7 mm, 1.70 mm, 1,500 mm and 252 g, respectively.

|  | Type of prepreg | Angle (°) | No. of plies |
|---|---|---|---|
| Inside | CF-UDPP | 90 | 2 |
| ↓ | GF-UDPP | 90 | 3 |
| ↓ | CF-UDPP | 0 | 4 |
| Outside | CF-UDPP | 45 | 2 |

The thicknesses of the carbon fiber-containing layer and the glass fiber-containing layer of the thus obtained laminated tube were 1.37 mm and 0.33 mm, respectively. The volume occupied by the reinforcing fibers in the laminated tube was 57%. The ratios of 90°-winding layer, 0°-winding layer and 45°-winding layer to the total were 45% by volume, 41% by volume and 14% by volume, respectively. The laminated tube had a logarithmic decrement of 0.07 and a flexural modulus, tube rigidity and impact angle of 2,170 kg/mm², 58 kg-mm and 95°, respectively. These results show that the laminated tube has poor vibration damping property and impact resistance.

Comparative Example 5

An aluminum pipe having an inside diameter, wall thickness and length of 21 mm, 1.61 mm and 1,500 mm was tested. It had a weight of 556 g and a logarithmic decrement of 0.05. The pipe is thus heavy and poor in vibration damping property.

Example 12

The laminated tubes obtained in the above Examples 1 through 11 and Comparative Examples 1 through 5 were used to fabricate bush cutters comprising:
- a main operating pipe,
- a power part comprising an engine on one end of the main operating pipe,
- a blade part comprising a disk-shaped rotating blade on the other end of the main operating pipe,
- a main shaft for transmitting power housed in the main operating pipe; and
- a handle mounted on the main operating pipe.

These bush cutters were used for actual forestry work.

Vibrations generated at the power part and blade part and transmitted to the operator's hand were in a lesser degree with the bush cutters utilizing each of the tubes obtained in Examples 1 through 11 being used than with those utilizing Comparative Examples 1, 2, 4 and 5. Further they were lighter than the bush cutter utilizing the aluminum pipe of Comparative Example 5. It was also noted that the bush cutters utilizing Examples 6 through 11 were able to withstand shocks occurring by the actual cutting operation. As a result the fatigue felt by operators using the bush cutters utilizing the tube obtained in Examples 1 through 11, in particular 6 through 11, was far more alleviated so that working efficiency was improved than those who used the bush cutters utilizing the tube obtained in Comparative Examples 1, 2, 4 and 5.

The bush cutter utilizing the tube obtained in Comparative Example 3 could not be used in practice because of strong jarring of the blade due to insufficient rigidity of the main operating pipe.

Obviously, numerous modifications and variations of the present invention are possible in light of the above teachings. It is therefore to be understood that within the scope of the appended claims, the invention may be practiced otherwise than as specifically described herein.

What is claimed is:

1. A laminated tube having a logarithmic decrement of at least 0.08 and a flexural modulus of at least 1,000 kg/mm² and comprising at least one layer (A) which comprises a composite material comprising an organic fiber and a resin and, integrally laminated therewith, at least one layer (B) which comprises another composite material comprising an inorganic fiber and a resin, wherein at least one of said layer (A) is so positioned as to have an outside diameter (do) an inside diameter (di) or both satisfying the following condition:

$$do < (3Di + Do)/4$$

$$di > (Di + 3Do)/4$$

wherein (Di) and (Do) mean the inside diameter and outside diameter of the laminated tube, respectively wherein layer (A) and (B) are constituted by a 90°-winding layer, an angled winding layer and a 0°-winding layer, and all of said 90°-winding layers are positioned at or near its inner surface, all of said angles winding layers are positioned at or near its outer surface and all or said 0°-winding layers are positioned between said 90°-winding layers and said angled winding layers.

2. A laminated tube according to claim 1, wherein the ratios of the volumes occupied by the 90°-winding layers, the 0°-winding layers and the angled winding layers based on the total volume are 20 to 50%, 25 to 60% and 10 to 35% respectively.

3. A laminated tube according to any one of claims 1 or 2, wherein said organic fiber is either a wholly aromatic polyester fiber or polyvinyl alcohol fiber.

4. A laminated tube according to any one of claims 1 or 2, used for bush cutters.

* * * * *